United States Patent
Lee et al.

(10) Patent No.: US 8,184,737 B2
(45) Date of Patent: May 22, 2012

(54) ECHO CANCELLATION AND ECHO CHANNEL ESTIMATION SYSTEM USING MULTIPLE ANTENNAS

(75) Inventors: Yong-Hoon Lee, Yuseong-gu (KR);
Jin-Gon Joung, Yuseong-gu (KR);
Eui-Rim Jeong, Yuseong-gu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 928 days.

(21) Appl. No.: 12/137,697

(22) Filed: Jun. 12, 2008

(65) Prior Publication Data
US 2009/0135945 A1 May 28, 2009

(30) Foreign Application Priority Data
Nov. 27, 2007 (KR) .................. 10-2007-0121580

(51) Int. Cl.
*H04B 15/00* (2006.01)
(52) U.S. Cl. ........ 375/285; 375/211; 375/267; 375/278; 375/284; 375/346; 333/165; 455/63.1; 455/296; 370/501; 370/492
(58) Field of Classification Search .................. 375/285
See application file for complete search history.

(56) References Cited

U.S. PATENT DOCUMENTS

| | | | | |
|---|---|---|---|---|
| 5,566,168 A | * | 10/1996 | Dent | 370/323 |
| 5,909,426 A | * | 6/1999 | Liau et al. | 370/203 |
| 6,496,581 B1 | * | 12/2002 | Finn et al. | 379/406.01 |
| 6,496,694 B1 | * | 12/2002 | Menon et al. | 455/426.2 |
| 6,958,987 B1 | * | 10/2005 | Herring et al. | 370/338 |
| 7,050,799 B2 | * | 5/2006 | Menon et al. | 455/426.2 |
| 7,322,041 B2 | * | 1/2008 | Bilgic et al. | 726/12 |
| 2003/0008632 A1 | * | 1/2003 | Menon et al. | 455/403 |

FOREIGN PATENT DOCUMENTS

| | | |
|---|---|---|
| JP | 2003-273831 | 9/2003 |
| JP | 2006-020211 | 1/2006 |
| JP | 2007-181166 | 7/2007 |

OTHER PUBLICATIONS

Hamazumi, H., et al. "A study of a Loop Interference Canceller for the Relay Stations in an SFN for Digital Terrestrial Broadcasting" IEEE vol. 1 pp. 167-171 (2000).
Suzuki, H. "A Booster Configuration with Adaptive Reduction of Transmitter-Receiver Antenna Coupling for Pager Systems." IEE VTC vol. 3 pp. 1516-1520 (1999).
Nasr, K.M. et al. "An Echo Canceller for DVB-T/H On-Channel Repeaters", (2007).
Nasr, K.M. et al. "Echo Cancellation and Channel Estimation for On-Channel Repeaters in DVB-T/H Networks", (2007).

* cited by examiner

*Primary Examiner* — Shuwang Liu
*Assistant Examiner* — Gina McKie
(74) *Attorney, Agent, or Firm* — Merchant & Gould P.C.

(57) ABSTRACT

Disclosed herein is an echo cancellation and echo channel estimation system that can relay transmit signals without interference with echo signals by canceling the undesired echo signals received by a relay. The echo cancellation and echo channel estimation system is designed to relay signals between a transmitter and a receiver through a relay using multiple antennas. The echo cancellation and echo channel estimation system includes a receive antenna, a preprocessing vector generation module, an echo cancellation module, and a transmit array antenna. The receive antenna receives a transmit signal from the transmitter and an echo signal via an echo channel. The preprocessing vector generation module generates a preprocessing vector and applies the preprocessing vector, the transmit signal and the echo signal, received from the receive antenna, to the echo cancellation module. The echo cancellation module cancels only the echo signal by multiplying the preprocessing vector, the transmit signal, and the echo signal. The transmit array antenna receives a retransmit signal from the echo cancellation module and resends the retransmit signal to the receiver.

2 Claims, 13 Drawing Sheets

ECHO CANCELLATION AND ECHO CHANNEL ESTIMATION SYSTEM USING MULTIPLE ANTENNAS

BACKGROUND OF THE INVENTION

1. Field of the Invention

The present invention relates to technology for relaying a transmit signal, which was received from a transmitter, to a receiver without interference with echo signals by canceling the echo signals.

2. Description of the Related Art

A relay system increases the possible communication distance and improves reception performance using a relay.

Such relays are classified into Amplify-and-Forward (AF) type, which amplify received transmit signals without change and resend the amplified signals, and Decode-and-Forward (DF) type, which decode received transmit signals, eliminate thermal noise from the signals, and resend the thermal noise-free signals.

Meanwhile, when the relay amplifies the received transmit signal and resends the amplified signal to the transmitter, a receive antenna of the relay also receives undesired echo signals. The echo signals cause interference with the transmit signal to be resent to the receiver.

Recently, research into technology for canceling echo signals causing interference, that is, an Interference Cancellation System (ICS), has been conducted.

Figure 1:
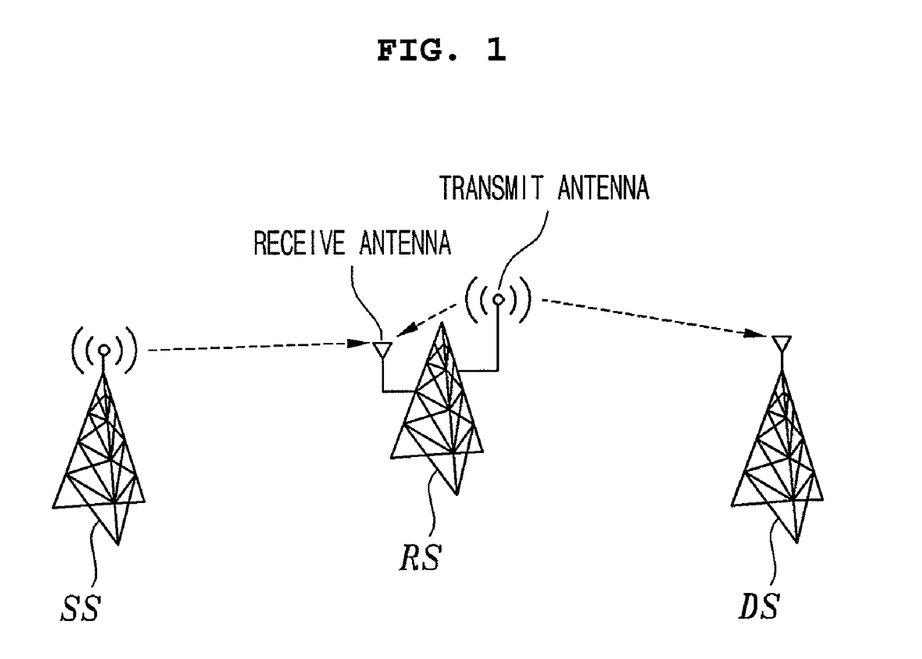
FIG. 1 is a configuration diagram of a conventional ICS.

As shown in FIG. 1, such an ICS has a Single-Input Single-Output (SISO) structure, and includes a Source Station (SS), a Relay Station (RS) and a Destination Station (DS).

An interference cancellation method of the ICS will be described below in more detail. First, the receive antenna of the RS receives a signal to be sent to the DS from the SS, and the transmit antenna of the RS amplifies the signal to be sent to the DS and resends the amplified signal to the DS. In this case, the signal that is amplified or processed by the replay is called a retransmit signal. During such a process, the receive antenna of the RS receives the retransmit signal resent from the transmit antenna of the RS to the DS via the echo channel. This signal is called an echo signal. The echo signal is received from the RS and interferes with the transmit signal to be resent to the DS.

Therefore, the amplification strength of the transmit signal to be resent to the DS is restricted in the transmit antenna of the RS in order to reduce the influence of the echo signal received at the receive antenna of the RS.

However, the installation of the filter for canceling echo signals generated in spite of the restriction in the amplification strength considerably complicates the receiver structure of the RS and does not guarantee the stable retransmission and reception of signals. That is, the continuous overlap and amplification of the remaining echo signals that are not completely cancelled may cause a saturation of echo signal in the retransmitted signal, which should be free from the echo signal.

SUMMARY OF THE INVENTION

Accordingly, the present invention has been made bearing in mind the above problems occurring in the prior art, and an object of the present invention is to provide an echo cancellation and echo channel estimation system which cancels echo signals by preprocessing and/or postprocessing and employing space multiplexing based on a structure of transmit and receive array antennas, thereby decreasing the amplification restriction of the relay, reducing the complexity of the system, and realizing the stable transmission of signals.

In order to accomplish the above object, the present invention provides an echo cancellation and echo channel estimation system for a relay using multiple antennas, the relay relaying signals between a transmitter and a receiver, the echo cancellation and echo channel estimation system comprising: a receive antenna for receiving a transmit signal from the transmitter and an echo signal via an echo channel; a preprocessing vector generation module for generating a preprocessing vector and applying the preprocessing vector, the transmit signal and the echo signal, received from the receive antenna, to an echo cancellation module; the echo cancellation module for preventing arising (or pre-cancelling) the echo signal by multiplying the preprocessing vector, the transmit signal, and the echo signal; and a transmit array antenna for receiving a retransmit signal from the echo cancellation module and resending the retransmit signal to the receiver.

In order to accomplish the above object, the present invention provides an echo cancellation and echo channel estimation system for a relay using multiple antennas, the relay relaying signals between a transmitter and a receiver, the echo cancellation and echo channel estimation system comprising: a receive array antenna for receiving a transmit signal from the transmitter and an echo signal via an echo channel; a postprocessing vector generation module for generating a postprocessing vector and applying the postprocessing vector, the transmit signal and the echo signal, received from the receive array antenna, to an echo cancellation module; the echo cancellation module for canceling the echo signal by multiplying the postprocessing vector, the echo signal, and the transmit signal, and the echo signal, received from the postprocessing vector generation module; and a transmit antenna for receiving a retransmit signal from the echo cancellation module and resending the retransmit signal to the receiver.

In order to accomplish the above object, the present invention provides an echo cancellation and echo channel estimation system for a relay using multiple antennas, the relay relaying signals between a transmitter and a receiver, the echo cancellation and echo channel estimation system comprising: a receive antenna for receiving a transmit signal from the transmitter and an echo signal via an echo channel; a Pseudorandom Noise (PN) generation module for generating an orthogonal PN signal, summing the PN signal and the transmit signal, and applying a PN-summed retransmit signal to a transmit array antenna; and the transmit array antenna for receiving the PN-summed retransmit signal from the PN generation module and sending the retransmit signal to the receiver.

BRIEF DESCRIPTION OF THE DRAWINGS

The above and other objects, features and other advantages of the present invention will be more clearly understood from the following detailed description in conjunction with the accompanying drawings.

DESCRIPTION OF THE PREFERRED EMBODIMENTS

Reference now should be made to the drawings, in which the same reference numerals are used throughout the different drawings to designate the same or similar components.

Figure 2:
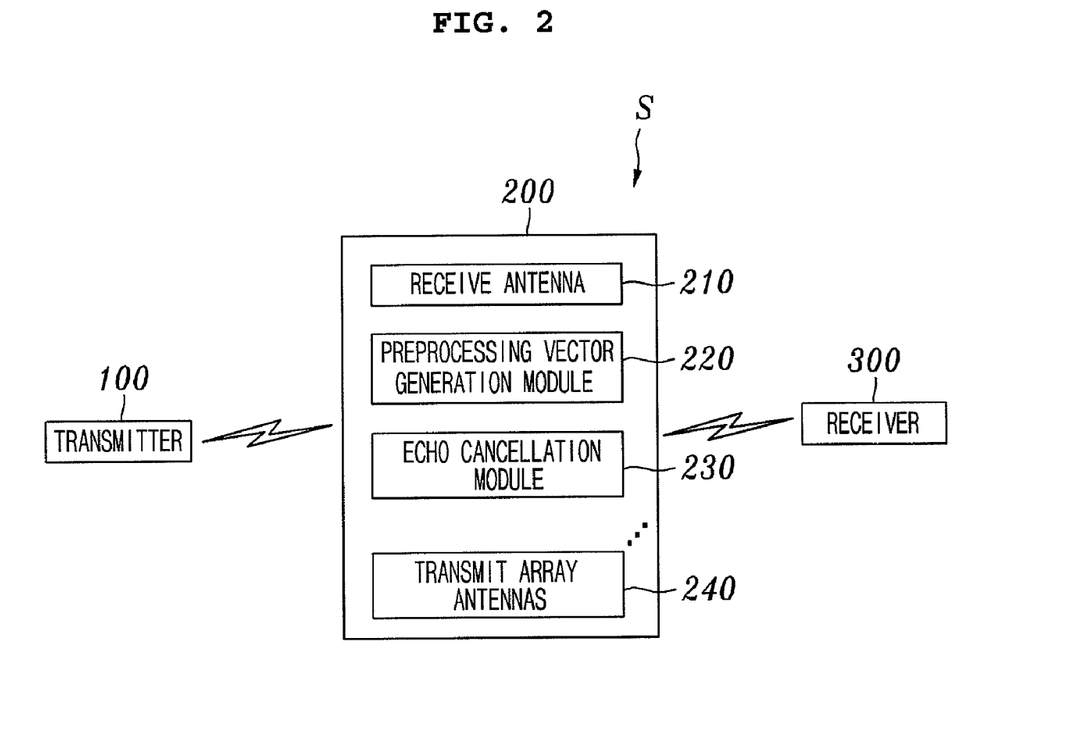
FIG. 2 is a configuration diagram of an echo cancellation and echo channel estimation system using multiple antennas according to a first embodiment of the present invention.

FIG. 2 is a configuration diagram of an echo cancellation and echo channel estimation system S using multiple antennas according to the present invention. The echo cancellation and echo channel estimation system S includes a transmitter 100, a relay 200, and a receiver 300.

Although not described below, it is assumed that a transmit signal of the present invention's transmitter 100 is x(t), a signal received by a receive antenna is r(t), a signal resent by a transmit array antenna 240 to the receiver 300 is z(t), and a signal received by the receiver 300 is y(t).

The transmitter 100 sends a transmit signal to the relay 200. The relay 200 resends the transmit signal, which is received from the transmitter 100, to the receiver 300 via a transmit array antenna 240. The receiver 300 receives the retransmit signal.

The relay 200 includes a receive antenna 210, a preprocessing vector generation module 220, an echo cancellation module 230, and a transmit array antenna 240.

The echo signal refers to a signal that is fed back to the receive antenna 210 of the relay 200 when the transmit array antenna 240 of the relay 200 resends the transmit signal to the receiver 300. The echo channel is a path through which the echo signal is applied, and it refers to a channel between the transmit array antenna 240 of the replay 200 and the receive antenna 210 of the relay 200.

The transmit array antenna 240 receives the retransmit signal from the echo cancellation module 230, amplifies the retransmit signal, and resends the amplified retransmit signal to the receiver 300. In this case, the retransmit signal according to the retransmission is echoed back to the receive antenna 210 of the relay 200 via the echo channel, and the receiver 300 receives the retransmit signal.

The echo cancellation module 230 prevents the occurrence of the echo signal by multiplying the preprocessing vector and the transmit signal, which is received from the preprocessing vector generation module 220 and applies a retransmit signal to the transmit array antenna 240.

Attribute to the echo cancellation module 230, the echo signal dose not occur any more, and then the receive antenna 210 of relay 200 dose not receive echo signal.

The receive antenna 210 receives a transmit signal from the transmitter 100 and applies the transmit signal to the preprocessing vector generation module 220. The preprocessing vector generation module 220 generates a preprocessing vector and applies the preprocessing vector to the echo cancellation module 230 together with the transmit signal.

Figure 3:
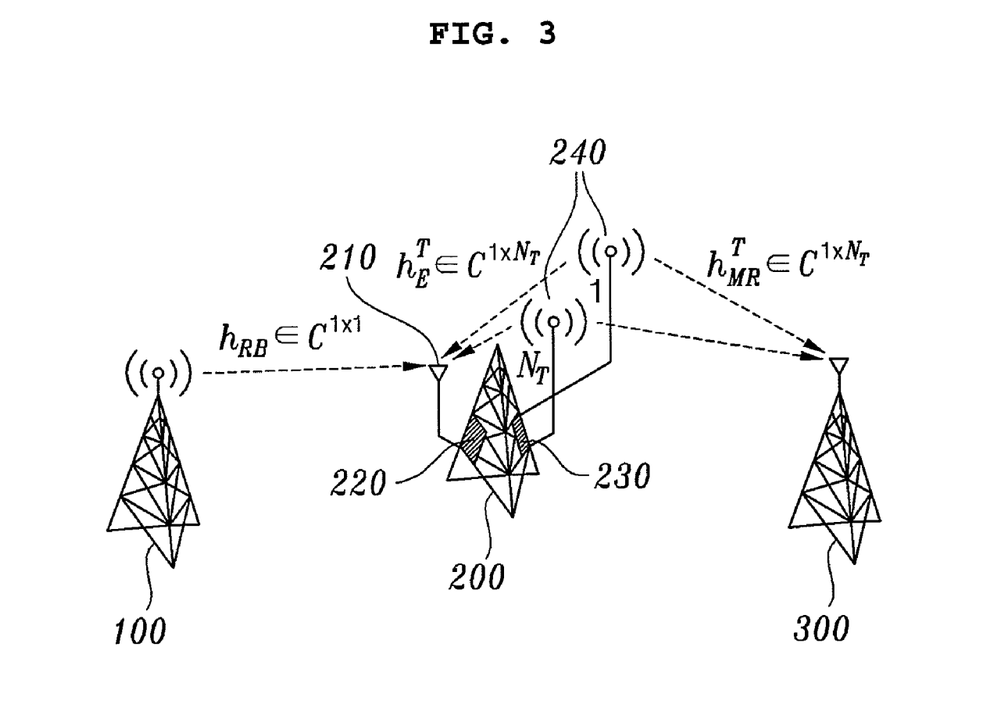
FIG. 3 is a diagram showing the physical relationship related to the echo cancellation and echo channel estimation system using multiple antennas according to the first embodiment of the present invention.

More specifically, FIG. 3 is a configuration diagram of the relay 200 including $N_T$ transmit array antennas 240 and one receive antenna 210. The echo channel can be expressed as a 1-by-$N_T$ vector channel $h_E^T=(h_{e,1} \ldots h_{e,N_T})$ between the $N_T$ transmit array antennas 240 and the receive antenna 210. Here, $h_{e,k}$ is a channel between the k-th transmit array antenna and the receive antenna. In summary, the signal model can be defined by Equation 1 shown below:

$$r(t) = h_{RB}x(t) + h_E^T \begin{pmatrix} z(t-d) \\ \vdots \\ z(t-d) \end{pmatrix} + n_R(t) \qquad (1)$$

In the above Equation 1, $n_R(t)$ is thermal noise of the relay 200 for time t. With regard to a signal r(t) received by the receive antenna 210 at time t, retransmit signal z(t−d) sent before time d from the transmit array antennas 240 via the echo channel, as well as a transmit signal from the transmitter 100, is multiplied by the echo vector $h_E^T=(h_{e,1} \ldots h_{e,N_T})$, and the resulting signal is received as the echo signal.

In addition, a signal received by the receiver 300 at time (t−d) can be expressed as in Equation 2 shown below:

$$y(t-d) = h_{MR}^T \begin{pmatrix} z(t-d) \\ \vdots \\ z(t-d) \end{pmatrix} + n_D(t-d) \qquad (2)$$

In the above Equation 2, $n_D(t-d)$ is the thermal noise of the receiver 300 at time t.

Figure 4:
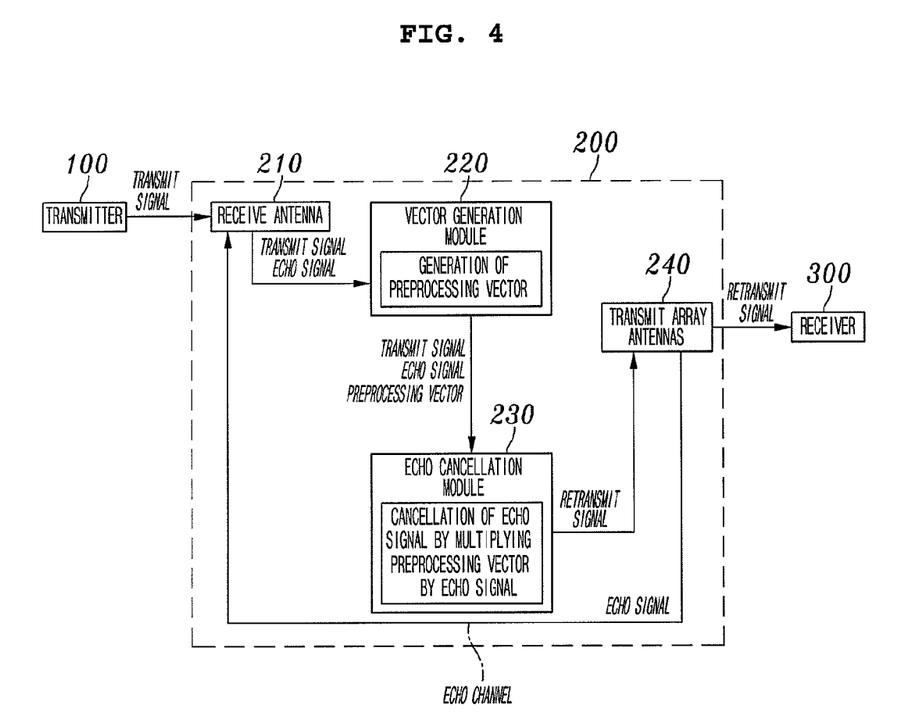
FIG. 4 is a diagram showing the cancellation of the echo signal according to the first embodiment of the present invention.

Referring to FIG. 4, the receive antenna 210 applies the transmit signal, which is received from the transmitter 100, and the echo signal, which is received via the echo channel, to the preprocessing vector generation module 220. The preprocessing vector generation module 220 receives the transmit signal and the echo signal from the receive antenna 210, estimates the echo channel, and generates the preprocessing vector from the estimated echo channel using the following Equation 3:

$$v=\text{Null}(h_E^T) \qquad (3)$$

In Equation 3, Null( ) of the preprocessing vector v is a function for obtaining a nulling vector, which is composed of the basis vector of the echo channel vector $h_E^T$ in null space, or a function for obtaining the nulling vector $v \in C^{N_T \times 1}$ having the characteristic shown in the following Equation 4:

$$h_E^T v = 0 \qquad (4)$$

Meanwhile, the echo cancellation module 230 generates the retransmit signal by multiplying the transmit signal, the echo signal, and the preprocessing vector v, received from the preprocessing vector generation module 220, and applies the retransmit signal to the transmit array antennas 240. The retransmit signal applied to the transmit array antennas is not echoed back to the receive antenna 210 of the relay 200 according to the characteristic of the above Equation 4 when it passes through the echo channel. Accordingly, the retransmit signal does not cause interference with the subsequent transmit signal.

As described above, the echo signal received via the echo channel is completely cancelled according to the zero-forcing (ZF) characteristic of the above Equation 4, and the above Equation 1 is redefined by the following Equation 5 according to the generated preprocessing vector.

$$r(t) = h_{RB}x(t) + h_E^T v z(t-d) + n_R(t) \qquad (5)$$
$$= h_{RB}x(t) + 0 + n_R(t)$$

The transmit array antennas 240 receive the retransmit signal from the echo cancellation module 230 and resend the retransmit signal to the receiver 300, and the receiver 300 receives the retransmit signal, which can be redefined by Equation 6 below, not Equation 2.

$$y(t-d) = h_{DR}^T v z(t-d) + n_D(t-d) \qquad (6)$$

In the above Equation 6, $h_{DR}^T v$ is a non-zero first-order effective channel. Compared with $h_{DR}$, which has the conventional SISO structure as shown in FIG. 1, $h_{DR}^T v$ does not degrade system performance. That is, since beamforming (space multiplexing) can be realized through the transmit array antennas 240, it is possible to prevent the echo signal from being applied to the receive antenna 210 via the echo channel.

Figure 5:
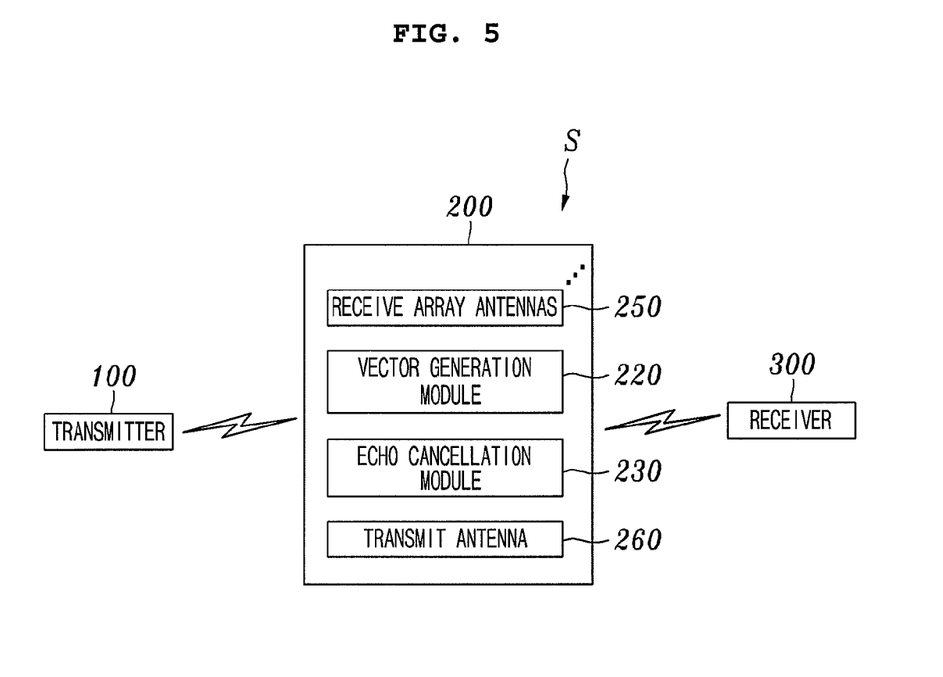
FIG. 5 is a configuration diagram of an echo cancellation and echo channel estimation system using multiple antennas according to second embodiment of the present invention.

A second embodiment of the present invention will be described below. An echo cancellation and echo channel estimation system according to the second embodiment of the present invention is based on the system according to the first embodiment of the present invention, but has a different relay configuration, as shown in FIG. 5. That is, the first embodiment realizes beamforming using the $N_T$ transmit array antennas 240, and the second embodiment realizes beamforming using $N_T$ receive array antennas.

Figure 6:
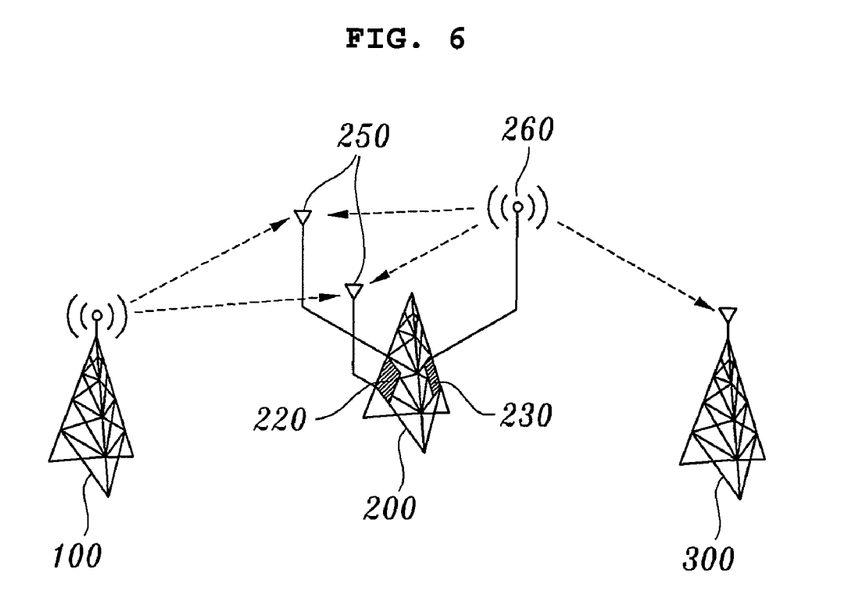
FIG. 6 is a diagram showing the physical relationship related to the echo cancellation and echo channel estimation system using multiple antennas according to the second embodiment of the present invention.

Referring to FIG. 6, an echo channel can be expressed as an $N_R$-by-1 vector channel $h_E$ between the $N_R$ receive array antennas 250 and the transmit antenna 260. It is assumed that a transmit signal of the transmitter 100 is x(t), a signal received by the receive array antennas 250 is $r(t) \in C^{N_R \times 1}$, a signal resent by the transmit antenna 260 is z(t), and a signal received by the receiver 300 is y(t). In summary, the signal model can be defined by the following Equation 7:

$$r(t) = h_{RS}x(t) + h_E z(t-d) + n_R(t) \qquad (7)$$

In the above Equation 7, $$h_{RS} = \begin{pmatrix} h_{RS,1} \\ \vdots \\ h_{RS,N_R} \end{pmatrix}$$

is a channel vector between the transmitter 100 and the receiver 300, $h_{RS,k}$ is a channel between the transmitter 100 and the k-th receive array antenna, $$h_E = \begin{pmatrix} h_{e,1} \\ \vdots \\ h_{e,N_R} \end{pmatrix}$$

is an echo channel vector, $h_{e,k}$ is a channel between the transmit antenna 260 and the k-th receive array antenna, and $n_R(t)$ is the noise vector of the $N_R$ receive array antennas 250. With regard to signal r(t) received by the receive array antennas 250 at time t, retransmit signal z(t−d) sent before time d from the transmit antenna 260 via the echo channel, as well as a transmit signal from the transmitter, is echoed back as an interference signal via the echo channel.

In addition, the signal sent at time t−d and received by the receiver 300 can be expressed as the following Equation 8:

$$y(t-d) = h_{DR}z(t-d) + n_D(t-d) \qquad (8)$$

Figure 7:
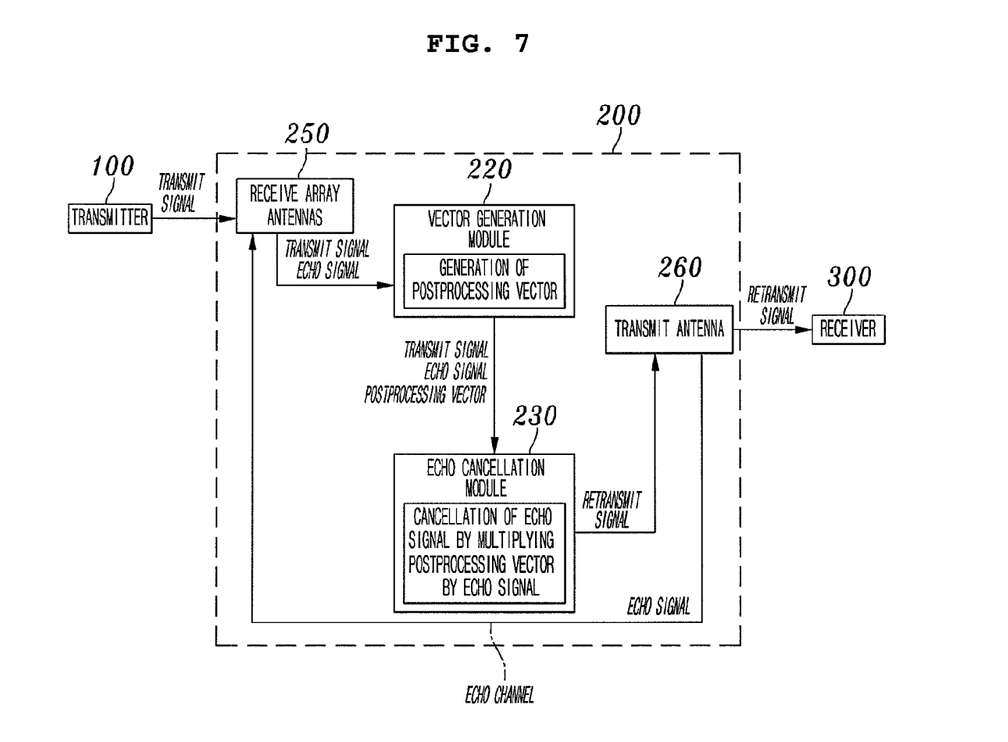
FIG. 7 is a diagram showing the cancellation of the echo signal according to the second embodiment of the present invention.

Referring to FIG. 7, the receive array antennas 250 applies the transmit signal, which is received from the transmitter 100, and the echo signal, which is received via the echo channel, to the postprocessing vector generation module 220. The postprocessing vector generation module 220 receives the transmit signal and the echo signal from the receive array antennas 250, estimates the echo channel, and generates the postprocessing vector from the estimated echo channel, based on the following Equation 9:

$$w^T = \text{Null}(h_E) \qquad (9)$$

In the above Equation 9, the postprocessing vector $w^T$ has the characteristic shown in the following Equation 10:

$$w^T h_E = 0 \qquad (10)$$

The echo cancellation module 230 removes only the echo signal by multiplying the transmit signal and the echo signal, which is received from the postprocessing vector generation module 230, by the postprocessing vector $w^T$ according to the characteristic shown in the above Equation 10. The retransmit signal is applied to the transmit antenna 260 without interference with the echo signal.

The echo signal received via the echo channel is completely cancelled according to the zero-forcing (ZF) characteristic of the above Equation 10, and the above Equation 7 is redefined by the following Equation 11 according to the generated postprocessing vector $w^T$.

$$w^T r(t) = w^T h_{RS} x(t) + w^T h_E x(t-d) + w^T n_R(t) \qquad (11)$$
$$= h'_{RS} x(t) + 0 + n'_R(t)$$

In the above Equation 11, $h'_{RS}$ is an effective channel between the transmitter 100 and the relay 200. Since $w^T w = 1$, a statistical characteristic of $n'_R(t)$ is equal to $n_R(t)$ of the above Equation 1. Compared with the channel $h_{RS}$ shown in FIG. 1, $h'_{RS}$ does not degrade system performance.

Figure 8:
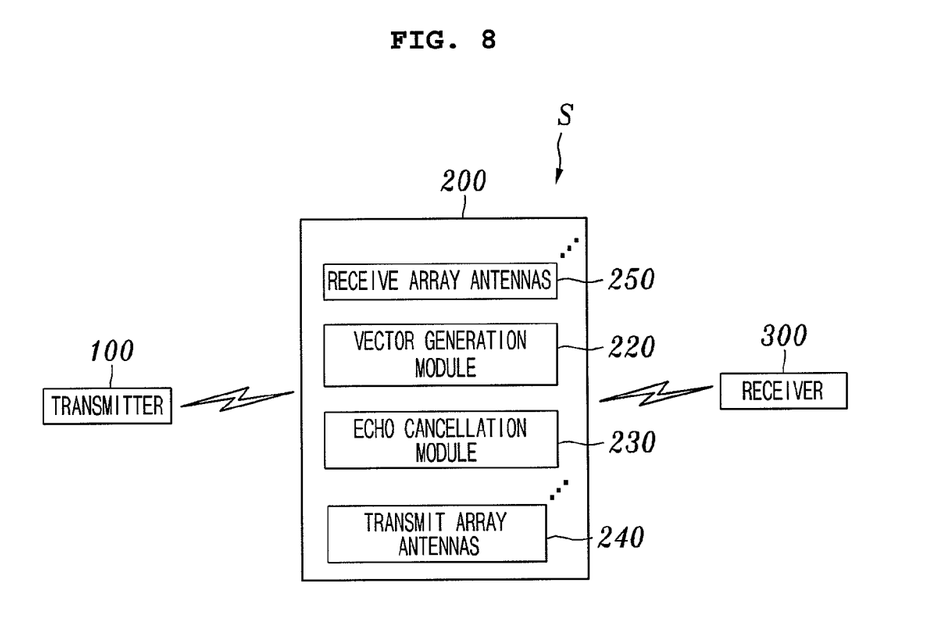
FIG. 8 is a configuration diagram of an echo cancellation and echo channel estimation system including a transmit array antenna of the first embodiment and a receive array antenna of the second embodiment.

The transmit antenna 260 receives the retransmit signal from the echo cancellation module 230 and resends the retransmit signal, which do not include the echo signal, to the receiver 300. Meanwhile, as shown in FIG. 8, the relay 200 may be configured with the transmit array antennas 240 and the receive array antennas 250, based on the systems of the first and second embodiments. More specifically, referring to FIGS. 9 and 10, the preprocessing/postprocessing vector generation module 220 receives the transmit signal from the receive array antennas 250 and the echo signal via the echo signal, generates the preprocessing vector using the above Equation 3, and generates the postprocessing vector using the above Equation 9.

Figure 9:
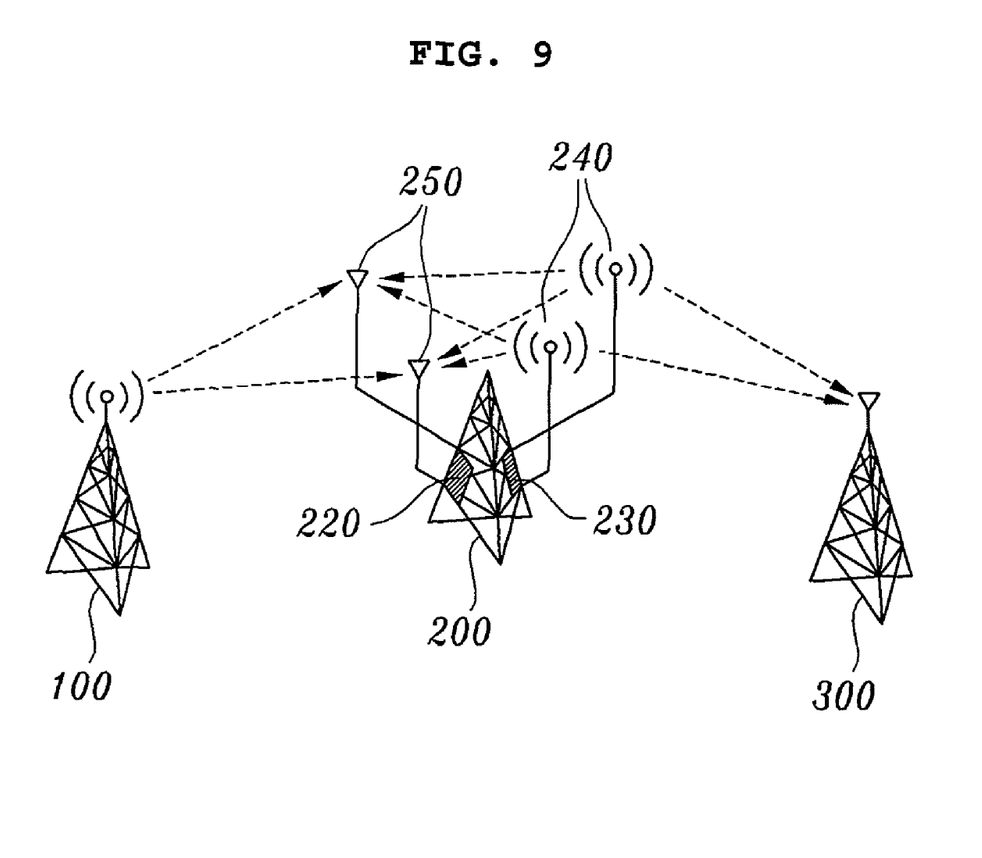
FIG. 9 is a diagram showing the physical relationship related to the echo cancellation and echo channel estimation system including the transit array antenna of the first embodiment and the receive array antenna of the second embodiment.
Figure 10:
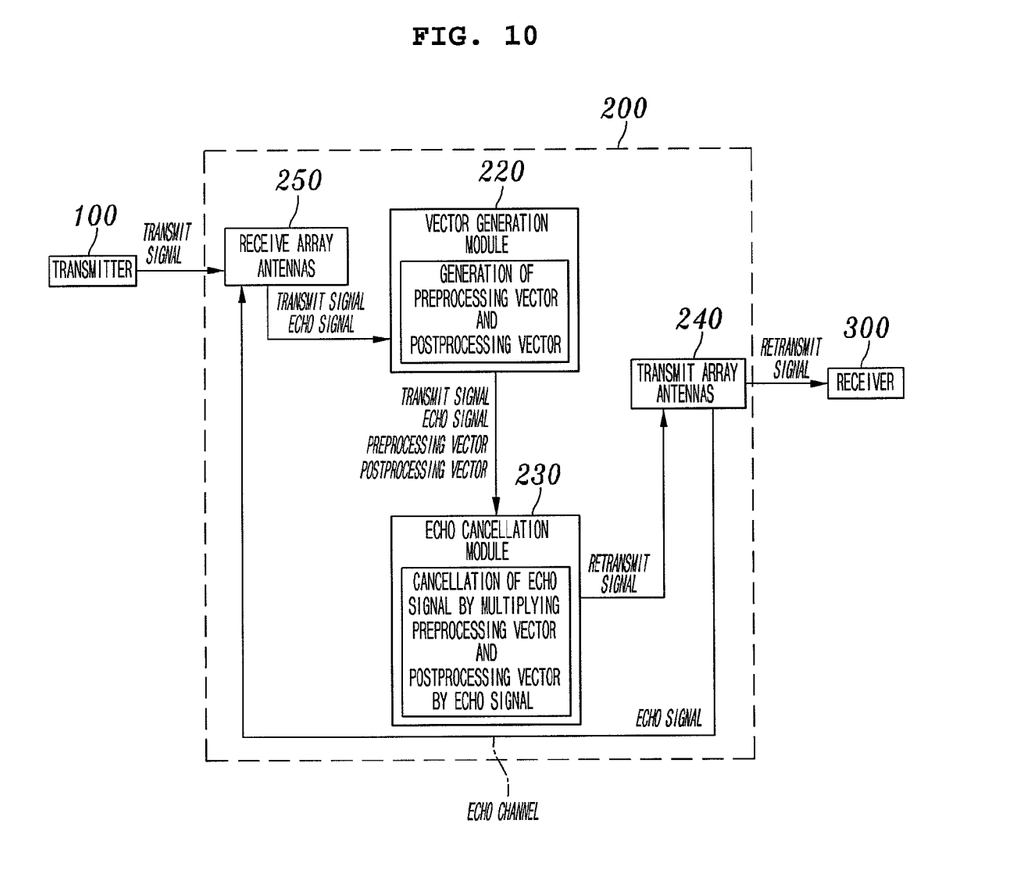
FIG. 10 is a diagram showing the cancellation of the echo signal in the echo cancellation and echo channel estimation system including the transmit array antenna of the first embodiment and the receive array antenna of the second embodiment.

The echo cancellation module 230 cancels the echo signal by multiplying the transmit signal, the echo signal, the preprocessing vector v, and the postprocessing vector $w^T$, which is received from the preprocessing/postprocessing vector generation module 220.

The transmit array antennas 240 receive the retransmit signal from the echo cancellation module 230 and resend the retransmit signal to the receiver 300. At the same time, the retransmit signal is echoed back to the receive array antennas 250.

Figure 11:
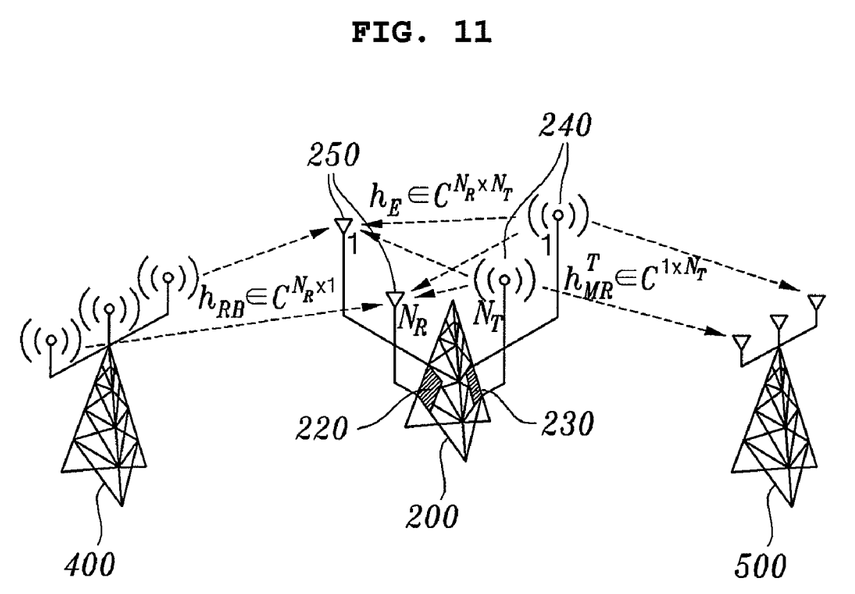
FIG. 11 is a diagram showing the physical relationship of a relay of a transmit signal between a transmitter with multiple antennas and a receiver with multiple antennas.

In addition, as shown in FIG. 11, the relay 200 including the receive array antennas 250, the preprocessing/postprocessing vector generation module 220, the echo cancellation module 230, and the transmit array antennas 240 can relay the transmit signal between the transmitter 100 with multiple antennas and the receiver 300 with multiple antennas, and can relay the transmit signal without interference with the echo signal by multiplying the transmit signal, the preprocessing vector, the postprocessing vector, and the echo signal.

A third embodiment of the present invention will be described below. An echo cancellation and echo channel estimation system according to the third embodiment of the present invention is based on the system according to the first embodiment of the present invention.

Figure 12:
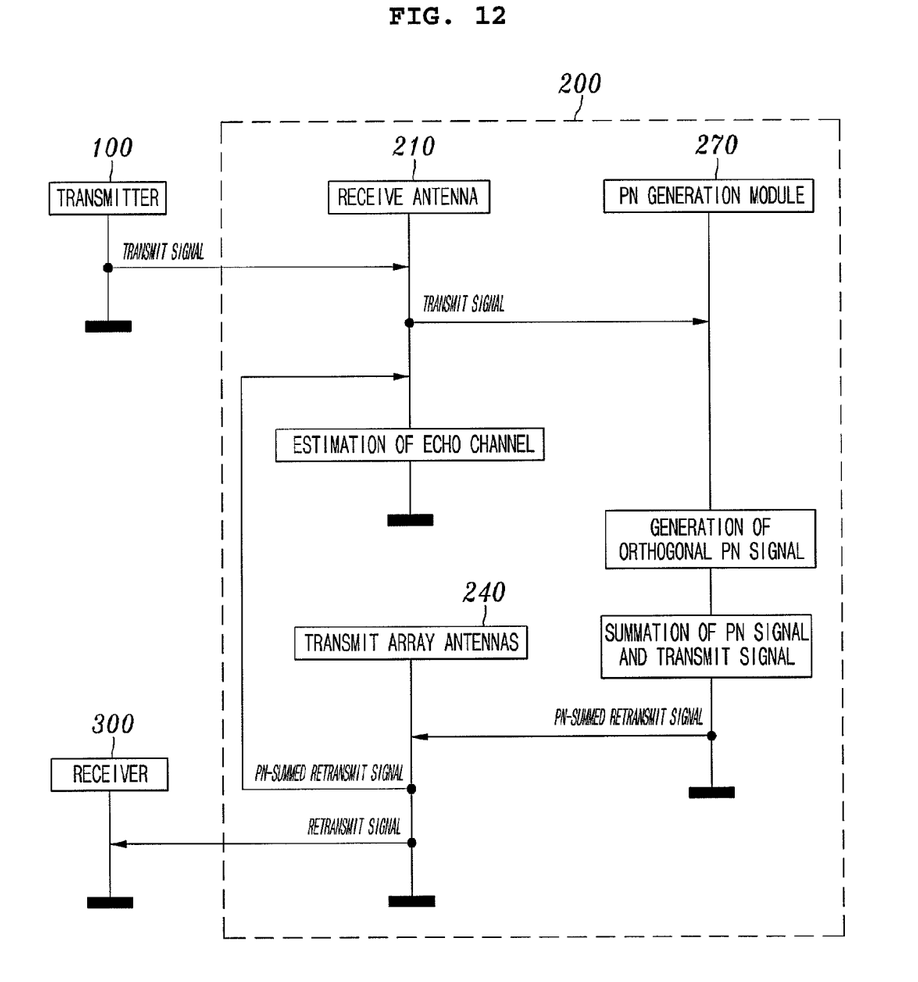
FIG. 12 is a diagram illustrating the estimation of the echo channel through the generation of a PN signal according to third embodiment of the present invention.

Specifically, referring to FIG. 12, a receive antenna 210 applies a transmit signal, received from a transmitter 100, and an echo signal, received via an echo channel, to a Pseudorandom Noise (PN) generation module 270.

The PN generation module 270 generates an orthogonal PN signal using the following Equation 12 based on a data vector z defined in the above Equation 1, sums the PN signal and the transmit signal, and applies a PN-summed retransmit signal to the transmit array antennas 240.

$$r^T = h_{RS}x^T + h_E^T \begin{pmatrix} z^T + PN_1 \\ \vdots \\ z^T + PN_{N_T} \end{pmatrix} + n_R^T \quad (12)$$

$$r^T(t) = h_{RE}x^T(t) + h_{e,1}\begin{pmatrix} z^T(t) + \\ PN_1(t) \end{pmatrix} + \ldots + h_{e,N_T}\begin{pmatrix} z^T(t) + \\ PN_{N_T}(t) \end{pmatrix} + n_R^T(t)$$

In the above Equation 12, r, x, and z are the vector expressions of length L of r, x, and z. For the k-th antenna, vector $PN_k$ of length L has an auto correlation characteristic and a cross correlation characteristic with the PN signal as shown in the following equation 13:

$$autocorrelation: \sum_{t=1}^{L} PN_k(t)PN_k(t+\Delta t) = L, \Delta t = 0 \quad (13)$$

$$\sum_{t=1}^{L} PN_k(t)PN_k(t+\Delta t) \cong 0, \Delta t \neq 0$$

$$crosscorrelation: \sum_{t=1}^{L} PN_k(t)PN_{k'}(t+\Delta t) \cong 0, \text{ when } k \neq k'$$

It is assumed that d is a propagation delay when a first symbol of the PN signal is received to the receive antenna 210 together with the echo signal via the echo channel. The PN signal resent after time d is echoed backed to the receive antenna 210 via the echo channel, interferes with the transmit signal received from the transmitter 100, and is accumulated during retransmit period L of the PN signal.

However, after L signals are received, an echo channel $h_E^T$ is estimated using the following Equation 14. The receive antenna 210 estimates the echo channel from the echo signal by accurately estimating time d from the PN-summed echo signal.

$$\frac{\sum_{t=1}^{L} PN_k(t)r(t)}{L} = h_{e,k}, \forall k \in 1,2,\ldots,N_T \quad (14)$$

The transmit array antennas 240 receive the PN-summed retransmit signal from the PN generation module 270 and resends the PN-summed retransmit signal to the receiver 300. In this case, the PN-summed retransmit signal is partially echoed back to the receive antenna 210 of the relay 200.

The receive antenna 210 receives the PN-summed echo signal and estimates the echo channel from the PN signal. The receiver 300 receives the retransmit signal from the transmit array antennas 240.

Meanwhile, the echo channel is estimated using a training sequences such as pilots or preambles.

The training sequences can be transmitted a specific time interval, the Transmit/receive Transition Gap (TTG) and the Receive/transmit Transition Gap (RTG), described in a international standard such as IEEE802.16e, WiMAX, and Wibro. As an example, the symbol time specification described in the Wibro Spec, the Orthogonal Frequency Division Multiplexing (OFDM) is 115.2 μs, the TTG is 87.2 us, and the RTG is 74.4 us.

Figure 13:
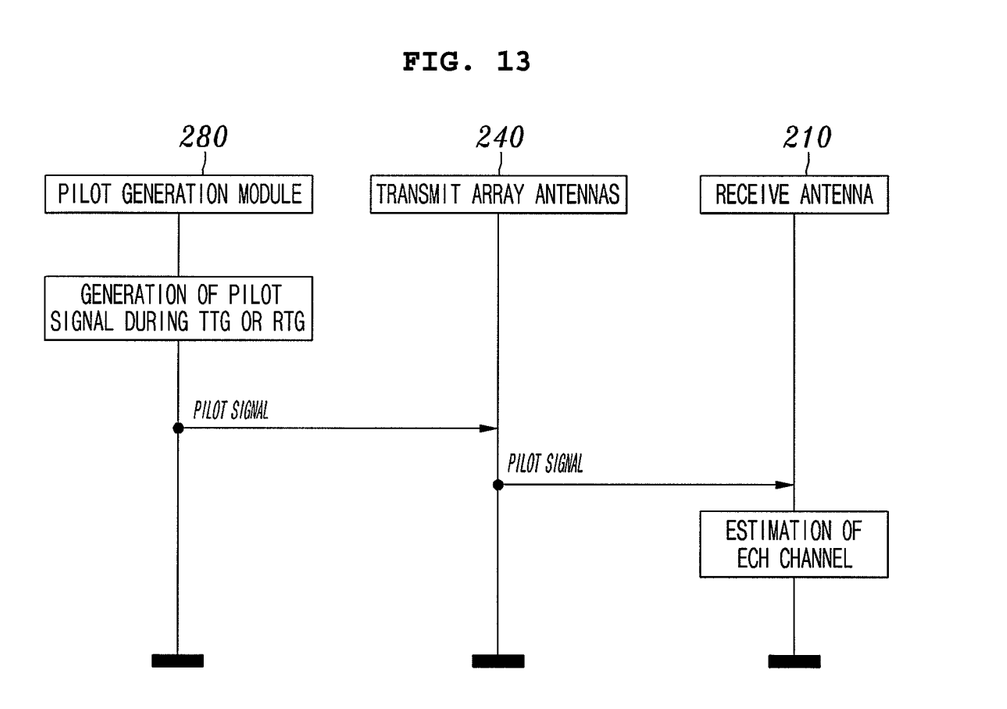
FIG. 13 is a diagram showing the estimation of the echo channel through the generation of a pilot signal according to a fourth embodiment of the present invention.

When 1 km cell is transmitted based on the previously-described symbol time, the propagation delay due to the propagation path is 3 us. As shown in FIG. 13, a pilot generation module 280 generates a pilot signal and applies the pilot signal to the transmit array antennas 240 during the TTG or RTG. In this case, since the pilot signal is transmitted/received during the TTG or RTG, signals other than the pilot signal are not transmitted/received.

The receive antenna 210 receives the pilot signal from the transmit array antennas 240 during the TTG or RTG and estimates the echo channel using the following Equation 15:

$$r(t+D) = h_{e,1}$$
$$r(2t+D) = h_{e,2}$$
$$\vdots$$
$$r(kt+D) = h_{e,k}$$
(15)

According to the above Equation 15, "1" is transmitted through one of the transmit array antennas 240 for the first sample time of the pilot signal, i.e., 115.2/1024 us, and "1" is transmitted through another of the transmit array antennas 240 for a next sample time. Accordingly, the signals have orthogonality according to time. The signal received by the receive antenna 210 during the sample time after propagation delay d is equal to the echo channel value. In addition, when the number of the transmit antennas 260 is one, only one pilot signal, that is, impulse, is transmitted. Accordingly, the echo channel can be estimated by measuring the value received by the receive array antennas 250. For example, when "1" is transmitted through one transmit antenna, the values received by the respective receive antennas become the echo channel values between the respective receive antennas and the transmit antenna.

Furthermore, the echo channel estimation can be realized through the retransmit signal. This can be used for additional assistance to the echo channel estimation. In particular, this can be used as an independent echo channel estimation method in the cases shown in FIGS. 5, 6 and 7. That is, the receive array antennas 250 receive the echo signal and the vector z, defined in the above Equation 1, from the transmit antenna 260. The above Equation 7 can be rewritten as the following Equation 16:

$$r_1^T = h_{RS,1} x^T + h_{e,1} z^T + n_R^T$$
(16)

The echo channel is estimated using the following Equation 17 by multiplying the above Equation 16 by the retransmit signal z. In this case, it is assumed that there is no interference in the retransmit signal z by the estimation of the propagation delay d, as Equation 14.

$$\frac{z^T r_1}{L} \approx h_{e,1}$$
(17)

According to the present invention, an echo signal can be cancelled through echo channel estimation, preprocessing and/or postprocessing. At the same time, the amplification restriction of the relay can be reduced through beamforming based on the structure of the transmit and receive array antennas.

Furthermore, the complexity of the system can be reduced through simple preprocessing and postprocessing vector generation, and the signals can be stably transmitted without interfering with an echo signal.

Although the preferred embodiments of the present invention have been disclosed for illustrative purposes, those skilled in this field will appreciate that various modifications, additions and substitutions are possible without departing from the scope and spirit of the invention as disclosed in the accompanying claims.

What is claimed is:

1. An echo cancellation and echo channel estimation system for relay using multiple antennas, the relay relaying signals between a transmitter and a receiver, the echo cancellation and echo channel estimation system comprising:
   a receive antenna for receiving a transmit signal from the transmitter and an echo signal via an echo channel;
   a preprocessing vector generation module for generating a preprocessing vector and applying the preprocessing vector, the transmit signal and the echo signal, received from the receive antenna, to an echo cancellation module, wherein the preprocessing vector is generated using the following equation:

$v = \text{Null}(h_E^T)$, where Null( ) of the preprocessing vector is a function for obtaining a nulling vector, which is composed of a basis vector of an echo channel vector $h_E^T$ in null space, and the nulling vector $v \in \mathbb{C}^{N_T \times 1}$ has a characteristic shown in the following equation:

$h_E^T v = 0$;

the echo cancellation module for canceling the echo signal by multiplying the preprocessing vector, the transmit signal, and the echo signal; and
   a transmit array antenna for receiving a retransmit signal from the echo cancellation module and resending the retransmit signal to the receiver.

2. An echo cancellation and echo channel estimation system or a relay using multiple antennas, the relay relaying signals between a transmitter and a receiver, the echo cancellation and echo channel estimation system comprising:
   a receive array antenna for receiving a transmit signal from the transmitter and an echo signal via an echo channel;
   a postprocessing vector generation module for generating a postprocessing vector and applying the postprocessing vector, the transmit signal and the echo signal, received from the receive array antenna, to an echo cancellation module;
   the echo cancellation module for canceling the echo signal by multiplying the postprocessing vector, the echo signal, and the transmit signal, and the echo signal, received from the postprocessing vector generation module, wherein the postprocessing vector is generated using the following equation:

$w^T = \text{Null}(h_E)$, and the postprocessing vector has a characteristic shown in the following equation:

$w^T h_E = 0$, where $h_E$ is an echo channel vector; and
   a transmit antenna for receiving a retransmit signal from the echo cancellation module and resending the retransmit signal to the receiver.

* * * * *